July 2, 1935.  C. E. MASTERS  2,006,645
ADJUSTABLE FOCI SPECTACLES
Filed Aug. 5, 1933   2 Sheets-Sheet 1
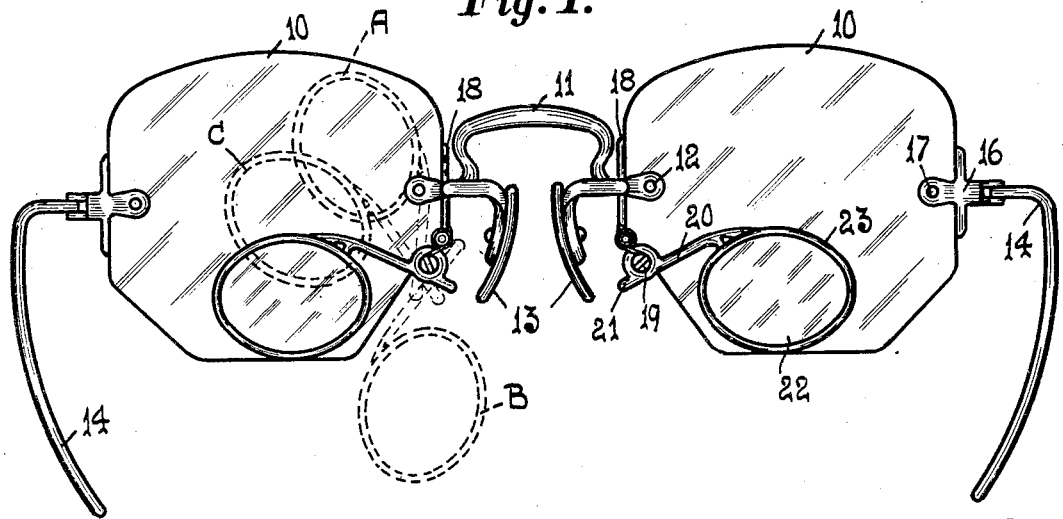
Fig. 1.
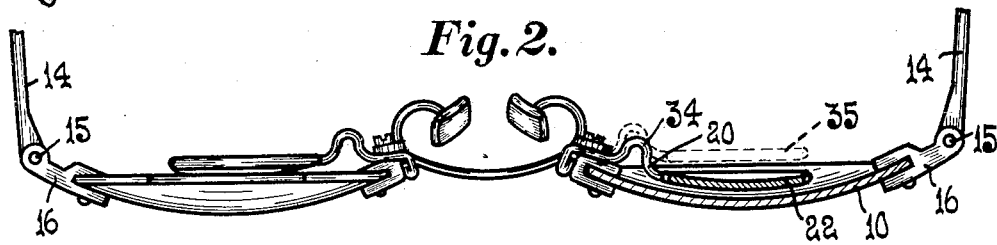
Fig. 2.
Fig. 3.
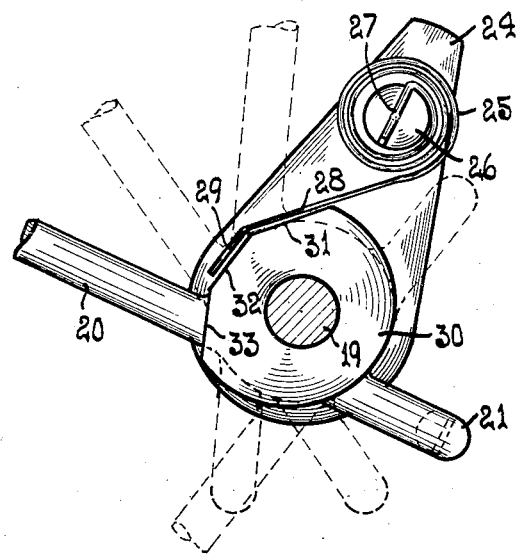
Fig. 4.
Inventor
C. E. Masters
By Arthur H. Sturges.   Attorney July 2, 1935.  C. E. MASTERS  2,006,645
ADJUSTABLE FOCI SPECTACLES
Filed Aug. 5, 1933    2 Sheets—Sheet 2
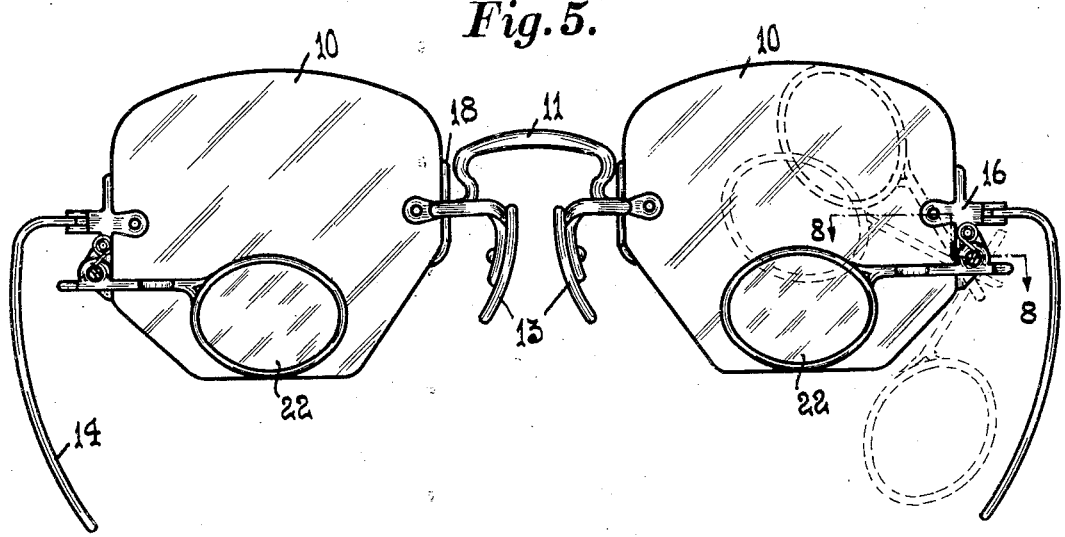
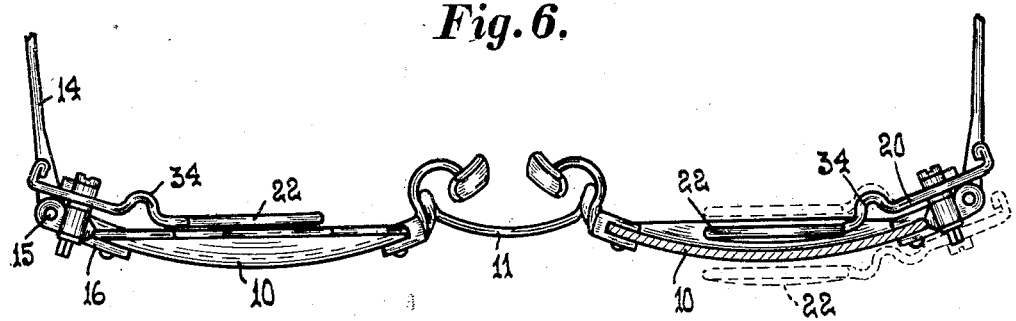
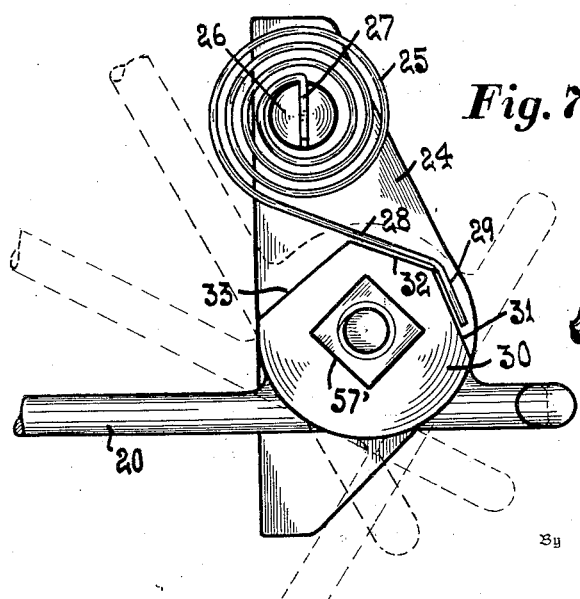
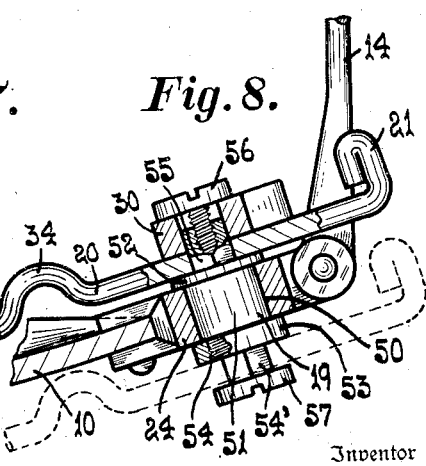
Inventor
C. E. Masters
By Arthur H. Sturges, Attorney Patented July 2, 1935

2,006,645

UNITED STATES PATENT OFFICE 2,006,645

ADJUSTABLE FOCI SPECTACLES

Clarence E. Masters, Chadron, Nebr., assignor of one-fifth to Greydon L. Nichols, Chadron, Nebr.

Application August 5, 1933, Serial No. 683,827

2 Claims. (Cl. 88—41)

This invention relates to optometry and more particularly to adjustable foci spectacles and has for an object a novel adaptation of lenses for the aid of the powers of vision.

Another object of the invention is to provide a pair of spectacles having lenses adapted for viewing distant objects and provided with adjustable separate lenses so arranged that they may be adjusted to a plurality of positions, four having been found of advantage, comprising a reading position, a position adapted particularly for use by doctors, music teachers and others who require the same and a position out of the line of vision of the user at times when the reading foci is not required and a cleaning position for the latter.

A further object of the invention is to provide supporting arms for the bi-focal lenses having means for facilitating bending the arms and providing a compensation for permitting the adjustment of the bi-focal lenses with respect to the eyes of an individual user in accordance with the required pupilary distance and for causing the bi-focal lenses to be positioned in parallelism with and to substantially conform to the curvature of the distance lenses in a plurality of positions of use.

A still further object of the invention is to provide eccentrically mounted lens carrying arms so arranged that the lenses are permitted to become swung upwardly completely out of the line of vision of a user and to provide a novel detent or clutch means for holding the bi-focal lenses in selected positions for various uses.

An important object of the invention is the provision of bi-focal spectacles, the reading foci thereof separated from the distance foci whereby initial manufacture is facilitated as well as the subsequent replacement of broken lenses at a minimum of expense, the replacement of parts facilitated and lessened in cost at times when the refractive states of the eyes of an individual user changes with advancing age and the like.

Other objects and advantages of the invention will be understood from the following detailed description thereof, reference being had to the accompanying drawings, in which:

Figure 1 is a vertical elevation of a pair of spectacles embodying the present invention and Figure 2 is a top plan view thereof, certain parts showing in section.

Figure 3 is an enlarged detail of a lens detent mechanism employed.

Figure 4 is an enlarged sectional view of a bi-foci lens and carrying frame or bezel therefor.

Figure 5 is a view similar to Figure 1 and showing a modification thereof and Figure 6 is a top plan view of the modification, certain parts showing in section.

Figure 7 is an enlarged detail of a modification of the lens detent mechanism employed.

Figure 8 is a horizontal section of the pivotal mounting for a lens shown in Figure 5, the view being taken on the dotted line 8—8 of said figure.

Referring now to the drawings and first to Figures 1 and 4, inclusive, 10 indicates a pair of distance lenses secured together in spaced apart relation by means of a bridge 11. The lenses 10 are provided with suitable apertures adjacent the inner edges thereof for receiving minute screws 12 positioned through the ends of a connecting bridge 11 and said lenses, the bridge being provided with nose rest members 13. Bows 14 are pivotally secured as at 15 to brackets 16 positioned adjacent the outer edges of the lenses 10 and secured to the latter by means of suitable keepers 17. Vertically disposed clips 18 are formed integral with the bridge 11 and bear against the edges of the members 10. The clips 18 at their lower ends are provided with flared platforms and pivot screws 19 to which swingable arms 20 are secured by means of said pivots. The arms 20 are provided with inwardly disposed tangs 21 and support reading lenses or the like 22 at their outwardly and divergently disposed ends, said supporting means may include, if desired, frames 23 formed of metal or any suitable substance.

The arms 20 are carried in an eccentrically disposed position with respect to their pivots, whereby the lenses may be swung to an extreme upward position out of the line of vision of a user, as shown by the dotted lines in Figure 1, the said particular mounting of the arms facilitating the same.

The flared platforms 24 of the clips carry minute coil springs 25 secured to the platforms by means of keepers 26, as shown in Figure 3. The springs are preferably of oblong rectangular contour in cross section, the fixed ends thereof being secured in kerfs 27 formed on the keepers 26 and coiled about the latter a desired number of turns, the free ends 28 thereof being provided with bent portions 29 so arranged that they are adapted to co-operate with the flat surfaces of the cams 30, the latter being jointed to the arms 20, the cams extending beyond the vertical plane of the arms 20 for providing bearing surfaces for the free ends 28 of the springs against the edges of the cams and the flat surfaces of the latter. The coiled portion of the springs also normally urge the bent portions thereof against the platforms 24 for retaining the bent portions in a position of co-operation with the cams. The edges of the cams 30 are provided with a suitable number of the flat surfaces; in the present illustration three being employed as indicated at 31, 32 and 33, as best shown in Figure 3 for purposes later described.

As best shown in Figure 2, the arms 20 are provided with offset portions 34 of substantially U-shape in plan for facilitating the application of a pair of minute tweezers within the offset portions of the arms for bending the latter and adjusting the lenses 22 in accordance with the pupilary distance required for an individual user, it being understood that the lenses 22 may thus be readily moved closely adjacent to the lenses 10 or away therefrom to the dotted line position 35 of the lenses 22. Also it will be noted that the arms 20 may thus be bent readily for causing the lenses 22 to be positioned in alignment with the curvature of the lenses 10 as may be desired as well as extending or retracting said lenses further away from or closer to the nose members 13 for positioning the lenses 22 with respect to the center of the pupil of the eye of a user, the U-shape portions of the arms providing an extensible slack for said purpose as well as facilitating the shortening of the arms in instances where the same is desired.

As shown in Figure 4, in instances where a carrying frame 23 is provided for the lenses 22, the former is provided with a bezel 36 whereby the lenses may be "snapped into" the bezel and readily removed therefrom, similar to the positioning of a watch crystal in its carrying frame.

In operation and use the invention is placed in front of the eyes of a user, the members 13 resting upon the nose, the reading lenses 22 being positioned closest to the eyes and the lenses 10 outwardly thereof. At times when it is not desired to use the lenses 22 the latter may be readily moved to the dotted line position indicated at A in Figure 1 out of the line of vision of the operator who may apply his finger or the nail thereof to the tangs 21 for causing said movement and it will be noted that this may be done without the removal of the spectacles from the nose and at this time the free end 28 of the spring will register with the flat surface 33 of the cam 30 for detaining the lenses 22 in the selected position A. Similarly the lenses may be moved to the reading position illustrated by the full lines in Figure 1, the springs co-operating with the flat surfaces 31 of the cams for detaining the lenses in such position. At times when it is desired to swing the lenses 22 beyond the plane of the lenses 10 and to the dotted line position B for cleaning purposes, the same may be readily consummated, the free ends of the springs at this time bearing upon the curved surface of the edges of the cams. Similarly the lenses 22 may be adjusted to and detained in the dotted line position C which is particularly adapted for certain types of work or use, the free ends of the springs at this time engaging the flat surfaces 32 of the cams.

The modification, as illustrated in Figures 5 to 8 inclusive, shows the bi-focal lenses pivotally carried at the outer edges of the distance lenses, the arrangement of parts being such that the bi-focal lenses may be selectively and swingably mounted inwardly or outwardly of the distance lenses in order to accommodate the individual requirements for pupilary distance of an individual user as may be desired.

Referring to the modification, the distance lenses 10 are secured together in spaced apart relation by means of a bridge 11, the latter being provided with nose rest members 13.

In the modification the brackets 16 are provided with platforms 24 for supporting coiled springs 25 secured to the platforms by means of keepers 26, as shown in Figure 7, the fixed end of the springs secured in the kerfs 27 of the keepers, the free ends of the springs having bent portions 29 adapted to co-operate with the flat surfaces of the cams 30 for detaining the lens arms 20 in selected positions as heretofore described and as shown in Figure 5.

As best shown in Figure 8, the lens arm 20 may be positioned selectively at either side of the distance lens 10 for accommodating the pupilary distance requirements of individual users by a means now to be described.

The platforms 24 are provided with a bore 50 for pivotally receiving the central portion 51 of a pivot member 19, the latter having an integral flange 52 and a removable nut 53 which functions as a flange, the latter being threadedly secured as at 54 to a threaded portion of the member 51, the nut being illustrated partially broken away for visualizing the construction. The flanges 52 and 53 bear against each side of the platform 24 for preventing lateral movements of the pivot. The pivot member 19 is provided at each of its ends with outwardly extending shafts 54' and 55, each of which are square in plan and tapped at their ends for receiving screws 56 and 57 the shaft 55 being of greater length than the oppositely disposed shaft 54'.

The cams 30 for each bi-focal lens 22 are provided with square apertures 57' for membering with the square shafts 55 of the pivot members 19, the lens arms 20 also being provided with squared apertures for membering with either of the shafts 54' or 55.

In operation a lens arm may be positioned between each distance lens 10 and the eyes of a user and when in said position the arrangement of parts is as shown by the full lines in Figure 8; the screw 56 at this time holding the parts together, the screw 57 having no particular function.

At times when it is desired to move a lens arm 20 to the dotted line position shown in Figure 8 for positioning the swingable lens, whereby in use it is further from the eye than the distance lens 10, the screws 56 and 57 are first removed together with the cam 30, the lens arm placed as shown by the dotted line position thereof and the screw 57 replaced for holding the lens arm upon the squared shaft 54', the cam 30 then being replaced over the squared shaft 55 together with the screw 56 for holding the cam upon said shaft, the bent portion 29 of the spring membering with the cam as heretofore described, said bent portion moving against the side of the platform by means of the transversely exerted urge of the coiled portion of the spring, the length of the movement being equal to the thickness of the removed lens arm 20 and at this time the head of the screw 56 will be positioned flush against the end of the squared shaft 55.

From the foregoing description it is thought to be obvious that adjustable foci-spectacles constructed in accordance with my invention are particularly well adapted for use by reason of the convenience and facility with which they may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as claimed.

I claim:—

1. In a spectacle structure including a pair of lenses and mounting means for said lenses; a bi-focal means for each lens comprising a swingable frame, a lens in said frame, a projecting arm secured at one end to the frame, a couple of pins connected to the mounting means and spaced apart, the other end of said arm pivoted to one of said pins and a cam mounted concentrically therewith for swinging the frame, the said cam having an outer circular edge with a portion thereof cut to provide a series of flattened surfaces, and an elongated strip spring having one end anchored to the other pin and coiled about the same, the said spring having its other end bent to selectively bear against the flattened surfaces whereby to hold the swingable frame in a selective position, and to engage the circular portion to permit further swinging movement of the frame.

2. In a spectacle structure including a pair of lenses and mounting means for said lenses; a bi-focal means for each of said lens comprising a swingable frame, a lens in said frame, an arm having one end secured to the frame, a fixed pin and a rotatable pin attached to the mounting means, the said rotatable pin having its end portions projecting beyond said mounting means, the other end of said arm mounted interchangeably upon either end portion of the rotatable pin to rotate therewith for operating the swingable frame in either the front or the rear of each lens carried by said mounting means, holding means for said arm and mounting means to space the same apart and to prevent sliding movement of the rotatable pin, a cam mounted on the inner end of said pin to rotate therewith for swinging the frame, the said cam having an outer circular edge with a portion thereof cut to form a series of flattened surfaces, and spring means connected to the fixed pin to bear against the flattened surfaces whereby to hold the swingable frame in a selective position.

CLARENCE E. MASTERS.